E. H. McGINNIS.
NUT.
APPLICATION FILED SEPT. 22, 1917.
1,276,785.
Patented Aug. 27, 1918.
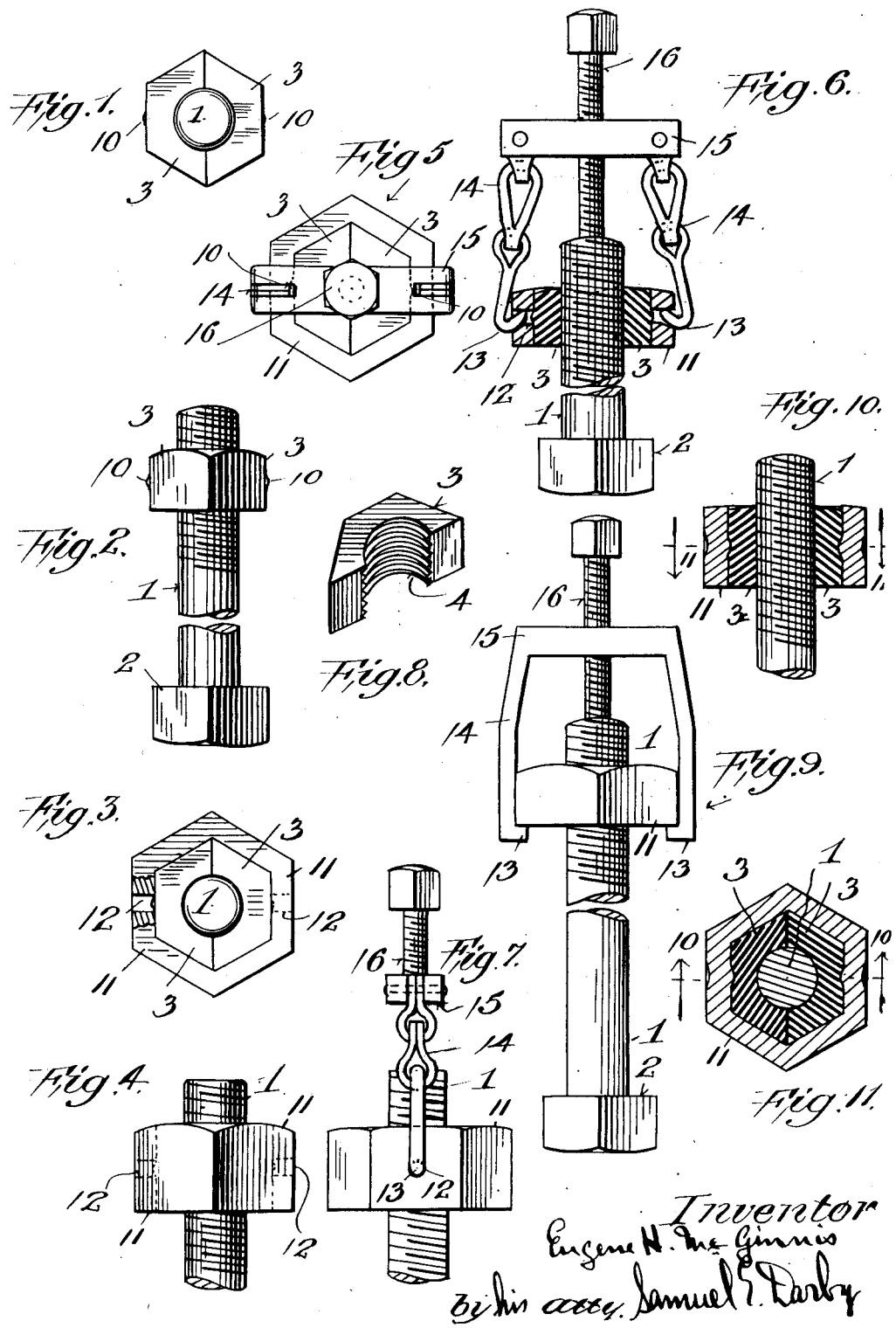

UNITED STATES PATENT OFFICE.

EUGENE H. McGINNIS, OF NEW YORK, N. Y.

NUT.

1,276,785.

Specification of Letters Patent.   Patented Aug. 27, 1918.

Application filed September 22, 1917.   Serial No. 192,646.

*To all whom it may concern:*

Be it known that I, EUGENE H. McGINNIS, a citizen of the United States, residing at New York, in the county of Bronx, State of New York, have made a certain new and useful Invention in Nuts, of which the following is a specification.

This invention relates to nuts, and more particularly to nuts known in the art as split nuts.

The object of the invention is to provide a simple, efficient, and economical type of nut which may be readily removed in case the same becomes rusted on a bolt or the like without injuring the bolt or the nut, and thus allowing the same to be used over and over again indefinitely.

A further object of the invention is to provide a simple means for taking off a nut of the foregoing type when the same has become rusted to a bolt.

Further objects of the invention will appear more fully hereinafter.

The invention consists substantially in the construction, combination, location, and relative arrangement of parts, all as will be more fully hereinafter set forth as shown by the accompanying drawing and finally pointed out in the appended claims.

Referring to the drawing:

Figure 1 is a top plan view of a nut assembled together embodying my invention.

Fig. 2 is a view in elevation of a nut and bolt.

Fig. 3 is a top plan view of the same after the same has become completely assembled.

Fig. 4 is a side elevation view of the structure shown in Fig. 3.

Fig. 5 is a top plan view of the completed structure with the detaching means applied thereto.

Fig. 6 is a view in side elevation of the same, partially in section.

Fig. 7 is a side view of the same.

Fig. 8 is a view in perspective of a half nut employed in accordance with my invention.

Fig. 9 is a view in front elevation of a modified arrangement embodying my invention.

Fig. 10 is a sectional view taken on the line 10, 10, Fig. 11, and looking in the direction of the arrows, of a modified arrangement.

Fig. 11 is a sectional view taken on the line 11, 11, Fig. 10, and looking in the direction of the arrows.

The same part is designated by the same reference numeral wherever it occurs throughout the several views.

It is among the special purposes of my present invention to provide a nut formed of a plurality of parts, which, assembled together, comprises the complete nut. I hold the assembled nut in place on the bolt by what I term a collar. I provide means for preventing the collar from being accidentally displaced, and in addition thereto, I provide a simple means for removing the collar when it is desired to unscrew the nut from the bolt. In accordance with my invention I so form the nut and collar that an ordinary wrench may be utilized to remove the same as a unit from the bolt. Where the nut has become rusted on the bolt however so that the removability thereof from the bolt is impossible, to avoid the necessity of sawing the bolt and thus destroy both the bolt and the nut which has been the practice heretofore, I propose to provide means which will remove the collar from the nut and thus allow the nut to fall apart or to be forced apart into its plurality of sections, thereby making it possible to again use the nut or the bolt, or both of them, again. In carrying out my invention I show at 1 a bolt of the usual standard structure, provided with a head 2. The type of bolt employed, of course, forms no part of my present invention, and I merely show this standard structure as illustrative of the principles of my invention which I will hereinafter set forth. The nut may be made in any desired number of sections. I prefer to make the same in two pieces 3 as shown. As a simple commercial product of manufacture the half pieces of nut may be made in any desirable manner, but I set forth one simple, efficient and cheap method of manufacture, which comprises making same out of metal stampings with the use of a die. With but a single stamping each half nut with its interior threads 4 may be made. Such a method insures a standard quality of nut with proper alinement of threads, and should greatly decrease the present cost of manufacture of nuts which requires the threads to be placed thereon after the nut body has been made. As shown I prefer to form the nut with the flat surfaces to form a grip for a wrench to unturn same in the usual manner. It is also apparent that the large number of nuts now in existence can be readily converted into nuts capable of use in accordance with my invention by merely splitting the same in the desired number of parts, for example, the two parts as shown in the specific embodiment thereof. Where the nut is made by die stamping I prefer to form on each portion thereof a slightly projecting lip 10 for a purpose which will be more fully hereinafter set forth. I provide a collar 11 of substantially the same height as the nut 3 and of the same shape, but of sufficient size to fit over the nut 3 to hold the same in its assembled position. This collar may be formed or manufactured in any desirable manner. One simple and efficient method of manufacture is to form the same of tubing cut in the desired size or width to conform with the size of the nuts. In one form of my invention I propose to provide a hole 12 through the collar 11 at the portions thereof where the projecting lip 10 of the nut comes in contact therewith so that the projecting lip 10 protrudes slightly into the hole 12 in the collar 11 to thus hold the nut in its assembled position. With this structure it is seen that a wrench can be applied to remove the collar and nut from a bolt wherever possible. Should the nut become rusted on the bolt so it is impossible to remove the same from the bolt without bending the bolt or otherwise injuring it to prevent further use of either the bolt or the nut, or both, the holes 12 in the collar 11 provide a means for teeth 13 carried by arms 14 pivotally secured to a bar 15 through which passes a small bolt 16 so that when the bar and the links 15 and 14 respectively are thus positioned as shown in Fig. 6 and the bolt 16 is screwed through bar 15 into contact with the bolt 1 and with sufficient force to press thereagainst so that as the bar 15 travels upwardly on the threads of the bolt 16 the collar 11 is pulled upwardly by links 14 off from the nut 3 which allows the split portions of the nut 3 to fall apart or be readily removed, and the bolt and the nut portions can be used over again as above set forth. If desired, and as shown in Figs. 10 and 11, the collar 11 may be formed with a slightly indented  coöperate with the slightly projec tion 10 of the nut 3, and the engag tion 13 of the link 14 may fit merel the edge of the collar 11 where by t the bolt 16 likewise removes the from the nut 3 as shown in Fig. 9

A further modified arrangemen in Figs. 10 and 11 wherein the slightly indented to form a portio to accommodate an indenture of t face in the collar 11 to thus hold tl and the nut in coöperative position to each other. In this form the ind the outer face of the collar 11 ma lized by the collar removing devi gage the same.

It is obvious that many other fo modifications will readily occur t skilled in the art without departing f spirit or scope of my invention as in the claims, and I do not desire to b ed or restricted therefore to the de construction shown and described therefore what I claim as new and and of my own invention and desir cure by Letters Patent, is:—

1. The combination with a hexag formed of a plurality of sections ad be placed together to form a comp and a collar of hexagonal shape to f over to hold said nut sections in sembled positions, and means for yi retaining said collar around said tions and against longitudinal m relative thereto.

2. A nut structure comprised of of equal size to form a complete n assembled, and each section provid outer surface with a projection, a re collar of similar peripheral shape w nut and adapted to fit around the sa provided with holes through the wa of to receive the projections on the tions to removably hold said nut sec position, and means for engaging sai in said holes for removing the san said nut.

In testimony whereof I have here my hand on this 7th day of Se A. D. 1917.

EUGENE H. McGIN